March 22, 1949.  A. M. FRANCHI  2,464,972
AIRCRAFT LANDING GEAR CONSTRUCTION
Filed Feb. 14, 1942  3 Sheets-Sheet 1
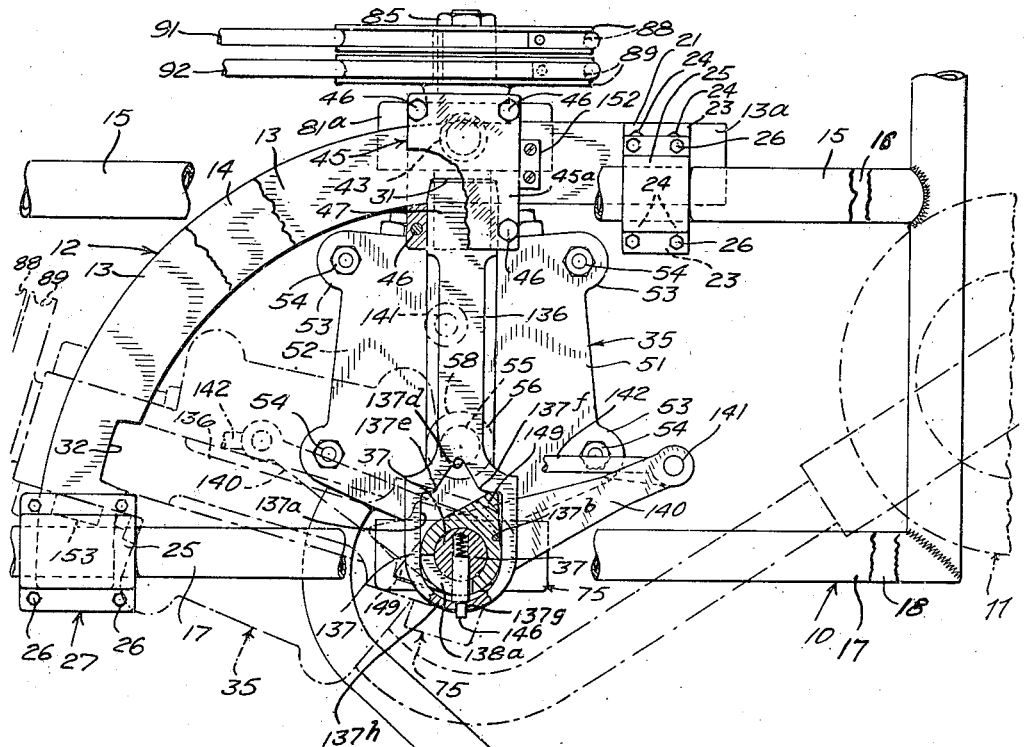
Fig. 1.
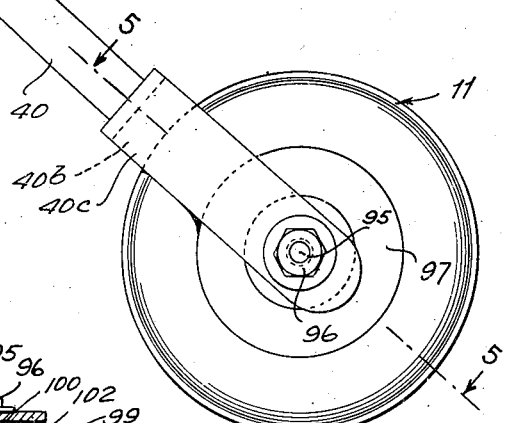
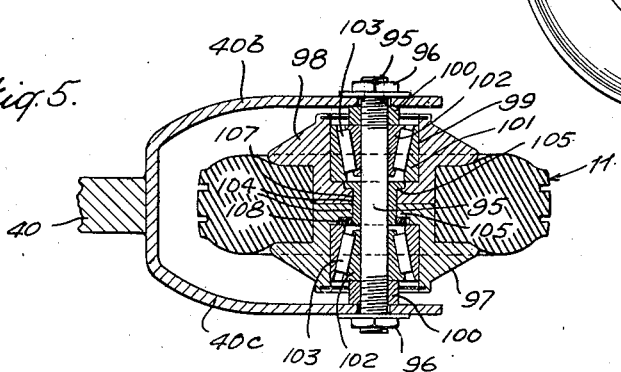
Fig. 5.
INVENTOR
ALDO M. FRANCHI.
BY William T. Kiesner
ATTORNEY March 22, 1949.  A. M. FRANCHI  2,464,972
AIRCRAFT LANDING GEAR CONSTRUCTION
Filed Feb. 14, 1942  3 Sheets-Sheet 2
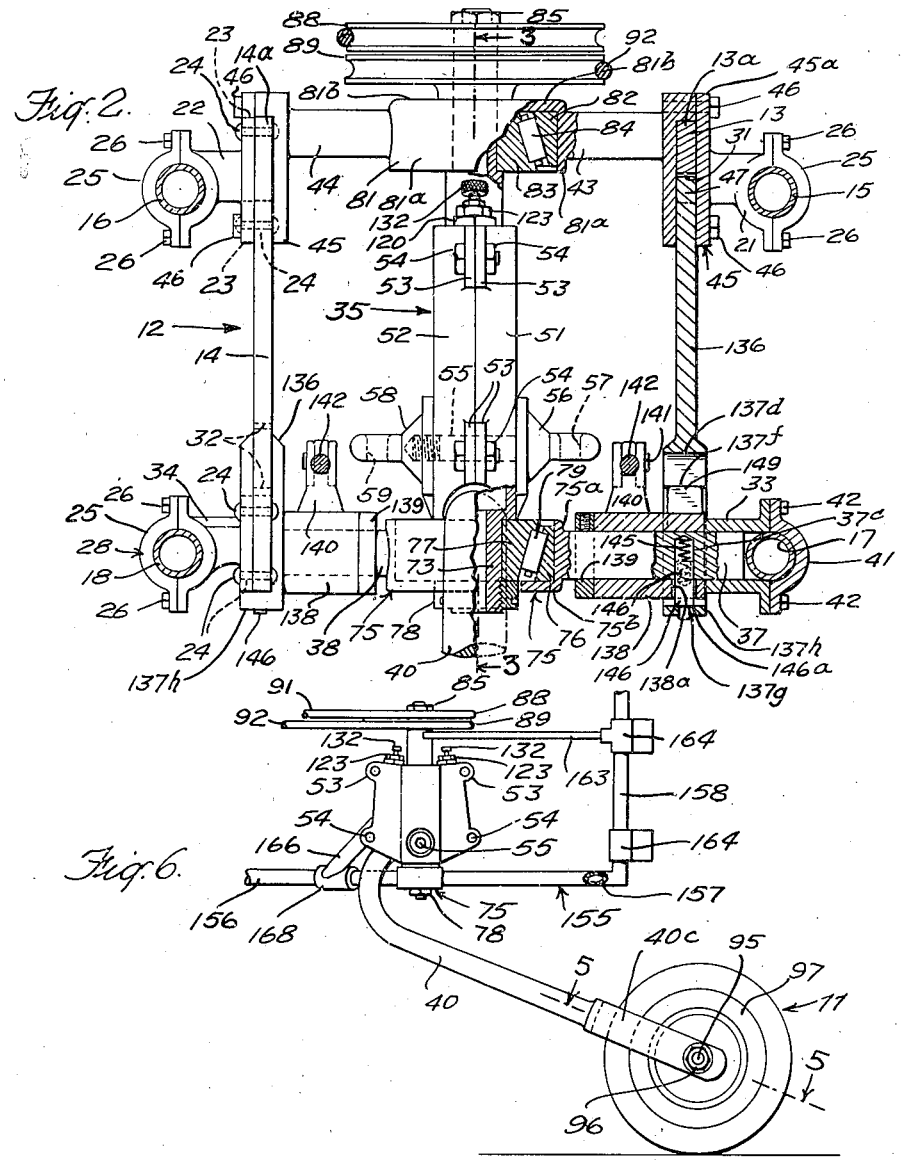
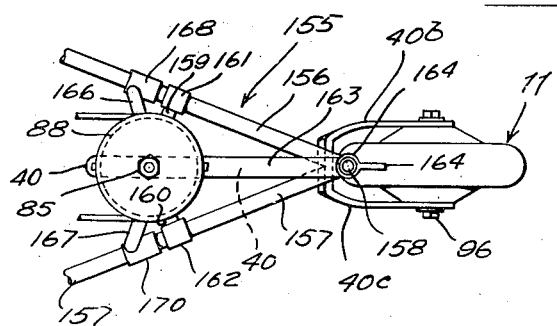
INVENTOR
ALDO M. FRANCHI.
BY
William T. Kneser
ATTORNEY

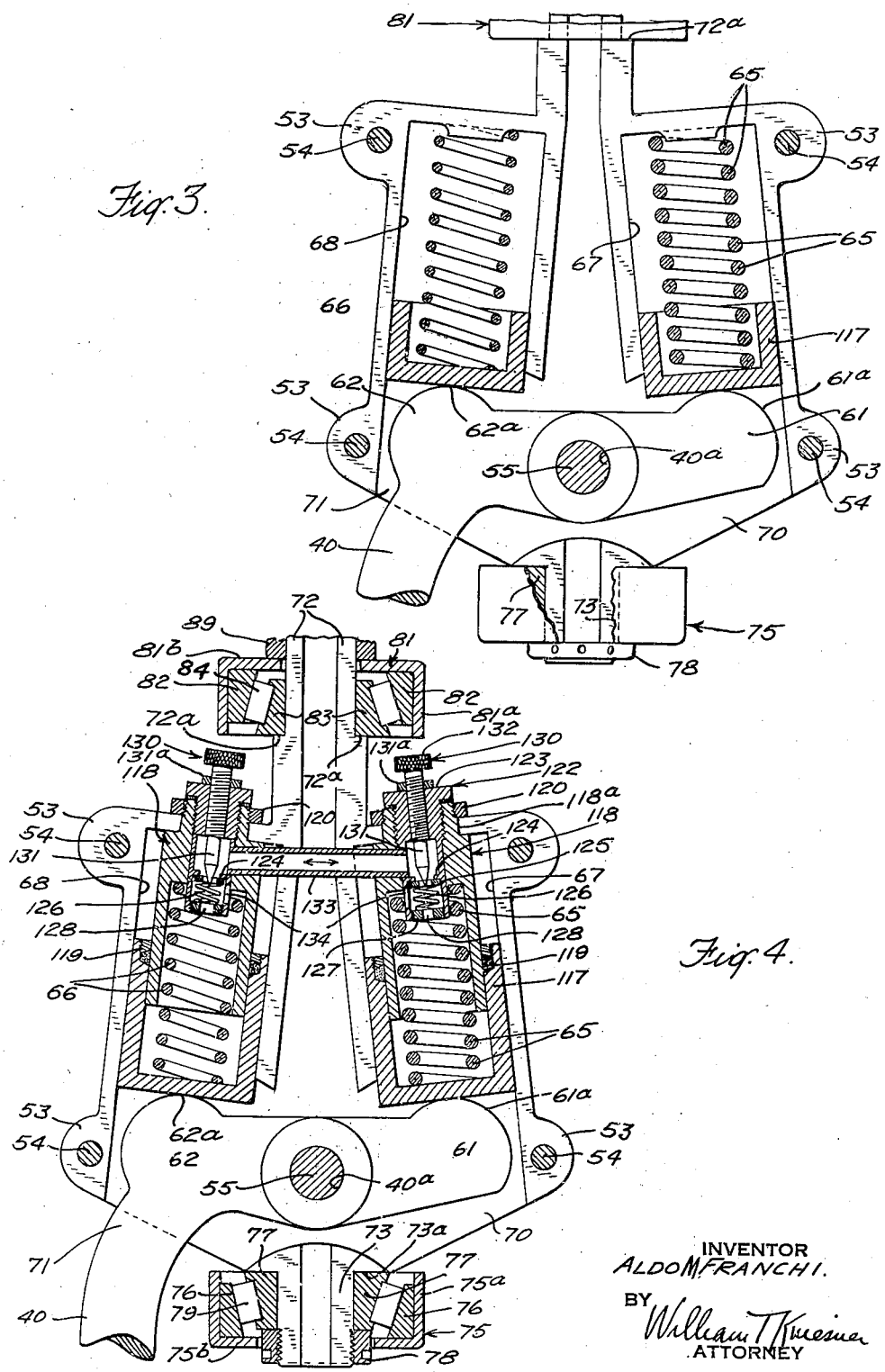

Patented Mar. 22, 1949

2,464,972

UNITED STATES PATENT OFFICE 2,464,972

AIRCRAFT LANDING GEAR CONSTRUCTION

Aldo M. Franchi, New York, N. Y., assignor of one-half to James T. Murphy, New York, N. Y.

Application February 14, 1942, Serial No. 430,954

20 Claims. (Cl. 244—102)

This invention relates to aircraft landing gear construction.

One of the objects of this invention is to provide a simple, practical and efficient wheel construction and mounting for aircraft, more particularly for the tail end of airplanes, that will be of dependable action under the varying conditions of practical use. Another object is to provide a construction of the above-mentioned character that will be simple to manufacture, capable of embodiment in light-weight yet strong form, capable of ready incorporation into aircraft construction, and capable of ease of assembly and disassembly. Another object is to provide a construction of the above-mentioned character in which the peculiar and sometimes sudden and severe strains and stresses that occur upon making a landing can be safely and reliably transmitted and absorbed or dependably counteracted by both wheel and its mounting and certain reliable coactions therebetween.

Another object is to provide a construction of the above-mentioned character arranged and constructed as a unit for ease and speed of assembly or disassembly relative to the aircraft itself and embodying, according to desire or circumstances, dirigibility or retractability or free caster-wheel action. Another object is to provide a construction of the above-mentioned character in which retractability or extension of the mounting for the landing element may be dependably and reliably achieved and controlled, and by mechanism that will be simple, strong, inexpensive and foolproof and positive in action. Another object is to provide for the dependable and simple locking or unlocking of the mounting in retracted or extended position and for the dependable and positive control thereof.

Another object is to provide a construction of the above-mentioned character in sub-unit or sub-assembly form or forms to facilitate assembly, repair, replacement or disassembly, or to achieve wider flexibility or adaptability of incorporation into an aircraft according, for example, to such factors as whether or not dirigibility or retraction or free caster-wheel action or any thereof is desired. Another object is to make possible structural standardization of certain sub-units or sub-assemblies to facilitate ready interchangeability, including interchangeability as between aircraft structures with or without dirigibility, with or without retraction, or with or without free caster-wheel action.

Another object is to provide a construction of the above-mentioned character in which dependable control of forces such as occur in making a landing can be achieved in a simple and foolproof manner. Another object is to provide a construction of the just-stated character which will have wide range of suitability to different conditions in practice, such as load, impact, landing speeds, and the like, and in which compensation or setting for such different conditions can be quickly and simply effected.

Another object is to provide a construction of the above-mentioned character that will have good durability throughout the hard and varying conditions of practical use and which will lessen the maintenance work and maintenance costs. Another object is, in general, to provide an improved construction and mounting for landing devices such as wheels used by aircraft. Other objects will be in part obvious or in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawings in which are shown several of the various possible embodiments of my invention, Figure 1 is a side elevation of a landing device in the form of a wheel with its mounting to the aircraft frame, only portions of which are shown, certain parts being broken away to better show certain other parts;

Figure 2 is an end elevation as seen from the left in Figure 1, certain of the parts being shown in central vertical cross-section, and others being broken away or omitted;

Fig. 3 is a view as seen along the line 3—3 of Figure 2, certain parts being shown in section and others in elevation, and certain other parts being omitted or broken away, showing one form of sub-unit construction;

Figure 4 is a view like that of Figure 3 but showing another form of sub-unit construction;

Figure 5 is a transverse sectional view as seen along the line 5—5 of Figure 1;

Figure 6 is a side elevation showing another mounting arrangement for the landing device and its main support; and Figure 7 is a plan view thereof as seen from above in Figure 6.

Similar reference characters refer to similar parts throughout the several views of the drawings:

Referring first to Figures 1 and 2 of the drawings, I have generally indicated by the reference character 10 part of the frame of an aircraft which may take any suitable form, but for purposes of illustration, let it be assumed that the frame 10 is part of the rear or tail frame of an airplane and that the landing devices are in the form of wheels of which at least one is to be at the tail end of the craft, illustratively the wheel generally indicated by the reference character 11, though it will be understood that certain features of my invention are not limited to the tail wheel or wheels and are applicable at points other than the stern or tail of the craft and useable with devices other than wheels, such as skids, pontoons or the like. Where the landing device is to be retracted, as during flight, I preferably provide a sub-assembly or auxiliary frame generally indicated by the reference character 12 and constructed for ready incorporation into or with the frame 10 of the craft.

Thus the auxiliary frame 12 may comprise preferably two spaced arcuate elements 13 and 14 held in spaced and parallel relation in any suitable manner illustratively and preferably by mountings upon or attachment to elements of the main frame 10.

For example, where the main frame 10 may have two upper spaced and usually parallel elements 15 and 16 and two lower spaced and parallel elements 17 and 18, usually and illustratively tubular, the forward or right-hand ends 13ª and 14ª of the auxiliary frame elements 13 and 14 respectively may be extended into respective parallelism to the frame elements 15 and 16 to which they may be respectively secured in any suitable manner, illustratively as by brackets 21 and 22 of suitable conformation and construction, illustratively like that shown in the drawings.

Thus, for example, each bracket may have a base portion 23 to rest flatwise against the auxiliary frame element to which it may be secured as by rivets 24 and may have a split and hence separable sleeve 25 dimensioned to encompass the main frame element such as the element 15, the two halves of the sleeve being then drawn and held together as by bolts 26, thereby to clamp securely therein the element of the craft frame. By such a construction, the forward or right-hand ends of the auxiliary frame elements 13 and 14, as viewed in Figure 1, may be quickly and dependably attached to the main frame, the split clamping sleeve construction permitting also ready setting of the auxiliary frame at the desired point lengthwise of the parallel frame elements 15—16.

The rear or left-hand ends of frame elements 13 and 14, as viewed in Figure 1, are secured respectively to the lower parallel frame elements 17 and 18, preferably by generally similar brackets as just described above and respectively indicated by the reference characters 27 and 28. The latter also have flat or base elements 23 secured to the auxiliary frame element in any suitable way as by rivets 24 and are provided with separable split sleeves 25 to encompass the frame elements 17 and 18 respectively, whence bolts 26 securely clamp the craft frame elements between the parts of the sleeves.

A suitable extent of each of the frame elements 13 and 14 is curved along the arc of a circle, illustratively as indicated in Figure 1, to an extent of about 90°, and in at least one of them, illustratively element 13, and preferably along the under edge thereof as seen in Figure 1 I provide notches or cut-outs, preferably of substantial proportions, as indicated at 31 and 32, positioning them at substantially the extremes of the 90° arcuate extent. Hence the cut-outs 31—32 are about 90° apart, where a 90° swing of the landing device suffices for retraction or extension.

At the axis of curvature of the frame elements 13—14, I provide two spaced bearings 33 and 34 for the pivotal support of a sub-unit preferably in the form of a housing generally indicated at 35, and this pivotal support preferably comprises two trunnion or shaft elements 37 and 38 supported at their outer ends in the bearings 33 and 34 respectively and secured at their inner ends to the housing 35 preferably in a manner later described. Housing 35 has suitable means, such as an arm 40, extending therefrom and supporting at its outer end the landing device such as the wheel 11, all preferably in the manner later set forth.

The bearing members 33—34 are suitably mounted or secured at the axis of the parallel and aligned auxiliary frame elements 13 and 14 and, as better appears from Figures 1 and 2, I may utilize, for this purpose, the lower frame elements 17 and 18 of the craft frame 10.

Thus, for example, each bearing member 33—34 terminates at its outer end in a split or clamping sleeve 41 with which to encompass respectively the craft frame elements 17 and 18 which are securely clamped within the sleeves by the bolts 42 which draw the sleeve parts together and thus dependably grip the frame elements.

At the upper end of the housing structure 35, I provide bracket-like arms 43 and 44 (Figure 2) mounted and secured as is later described and terminating in sleeve-like or box-like housings 45 which respectively embrace the frame elements 13 and 14, having an internal cross-section substantially similar to the cross-section of the frame elements which they embrace, illustratively rectangular and preferably of the same curvature, and preferably proportioned so as to form therewith a sliding fit.

For convenience of assembly and disassembly, the box-like guide elements 45—45 are made in separable parts, preferably two in number, the outer part 45ª being preferably in the form of a plate detachably secured in position as by the screws 46, the plate part 45ª overlying the outer face of the auxiliary frame element to which its companion box-like part is slideably related.

Accordingly, the housing structure 35, with its arm 40 and wheel 11 may freely pivot about the axis of the spaced bearings 33—34 and throughout an angle according to the arcuate extent of the curved portions of the auxiliary frame elements 13—14 and I preferably limit the extent of this pivoting movement by the coaction with the cut-outs 31 and 32 of a stop element 47, shown in Figure 1 as bottoming in the cut-out 31, and carried and controlled in a manner later described.

In making a landing, the landing device such as the wheel 11 is in extended position and hence in the position shown in Figure 1, the direction of travel of the craft being from the right to the left and the above-described assembly of the various parts to the craft frame elements achieves a desirable distribution throughout the latter, illustratively four of them (illustratively elements 15—16—17—18, of Figure 2), the illustrative assembly above described providing at least six distributed points at or through which landing impact, preferably cushioned and controlled in the manner later described, is taken up by the craft frame or by or through which the normal load to be carried by the wheel or like structure is transmitted to the latter from the craft itself, thus avoiding undue concentration of such forces or reactions or strains and stresses resulting therefrom. Moreover, these numerous and relatively widely distributed points, because of the relationship of the parts thereat secured to the frame elements, will be seen also to greatly reinforce and strengthen the craft frame structure and thus better condition it to stand up under the strains and stresses like those above mentioned.

Thus, for example, and as is later more clearly brought out, the transverse elements 37—38 and 43—44 of Figure 2 are rigidly secured together and to the frame structure 35 so that each takes part in transmitting or receiving strains or stresses relative to the craft frame and relative to the auxiliary frame elements 13—14, and together with the latter, which are anchored to both the upper and lower pairs 15—16 and 17—18 of the craft frame 10, aid and coact in distributing strains and stresses from or to the craft frame at the several distributed points of attachment earlier above described.

The housing structure 35 is preferably constructed, for facility of assembly and facility or flexibility of adaptation, in several, preferably two, sections and in Figure 2 the two sections are indicated at 51 and 52, being preferably symmetrical or identical and at their mating or contacting edges they have suitable extensions such as lugs or ears 53 (see also Figures 3 and 4) suitably apertured to receive bolts or screws 54 whereby the two casing parts 51—52 may be rigidly secured together.

The side walls of the casing parts 51—52 are suitably thickened adjacent their lower central portions to receive therethrough a bolt 55 having a head 56 shaped to provide an eye 57 and receiving on its threaded end a nut 58 shaped to provide an eye 59; the bolt may assist in holding the two casing parts together and, bridging across the hollow interior of the casing 35, it forms a pivotal support for the arm 40 which is provided at its inner and upper end, in any suitable way, as by forming integrally therewith, with two spaced abutments 61 and 62, each to one side of the axis of the pivot stud or bolt 55 and presenting faces 61ª and 62ª of suitable configuration and area, substantially as shown in Figure 3, to form seats for the lower ends of helical springs 65 and 66 respectively. These springs are housed and guided in cylindrical chambers or cylinders 67 and 68 respectively, the walls of which are integral with the casing structure 35, and where the latter is in two parts such as parts 51 and 52, each part has integrally formed with it half or a 180° extent of each of the two cylinders so that when the two halves are assembled, with the springs laid into their respective cylinders, the springs become housed in their respective cylindrical chambers and each is by its cylinder, which is open-ended at the lower end as viewed in Figure 3, thus also assembled to the respective abutments 61—62 of the arm; the arm 40, as is better shown in Figure 3, is bored out or drilled as at 40ª, intermediate of the abutments 61—62 and is of suitable length in the direction of the axis of the pivot pin 55 to provide a long and good bearing surface, preferably extending between the opposed lateral walls of the housing 35 as viewed in Figure 2 so as to be free from end play.

The two housing parts 51—52 are open or cut away, preferably on both sides of the vertical axis as seen in Figures 3 and 4 and as indicated at 70 and 71 so as to provide suitable openings in the lower end of the casing 35 through either of which the arm 40 may extend with adequate clearance according to the range of pivoting of the arm about the pivot pin 55. Assembly of the arm to the casing is preferably achieved by laying the upper part of the arm in one casing section, then laying the springs in place as above described, and then laying the other casing section thereover and securing the two casing sections together as by the bolts 54 and the pivot bolt 55 which is threaded through the openings in the casing side walls and also through the bore 40ª of the arm.

As will be seen from Figures 2, 3 and 4, the casing structure 35 has extending from it, at its upper and lower ends and along its central vertical axis, cylindrical studs 72 and 73 preferably integrally formed therewith, and where the casing structure is in, for example, two parts like the parts 51—52, one-half or a 180° extent of each of the studs 72 and 73 is integrally formed with each casing section, the halves becoming properly aligned and assembled when the two casing sections are fastened together as above described. Where lightness of weight is desired, these studs are preferably hollow and hence annular in cross-section, having in effect a tubular conformation. Each casing section may conveniently be in the form of a casting of suitable metal, and its conformation and machining where necessary will be seen to lend themselves readily to manufacture in that manner.

Preferably, by means of the studs 72—73, the assembled sub-unit is mounted in position and as will be more clearly brought out hereinafter it will be seen that a variety of different practical requirements or conditions may be thereby easily met. For example, let it be assumed that the landing device is to be both retractible and dirigible; in such case I prefer to utilize the studs 72—73 to mount this sub-unit in the cross arms 37—38 and 43—44 above described in connection with Figure 2, and an illustrative and preferred manner of achieving such a mounting is better shown in Figures 2 and 1.

Thus, referring to Figure 2, the studs or arms 37—38 have rigidly secured to them at their inner ends a cup-like bearing housing 75 within the cylindrical wall 75ª of which is fitted the outer race 76 of a suitable anti-friction bearing whose inner race 77 has an inside diameter to be received over the casing stud 73, the bottom wall 75ᵇ of the housing 75 having a hole to take over or about the stud 73 with a suitable amount of clearance. The lower end of the stud 73 is threaded to receive a nut 78 for holding the bearing assembly clamped in place between itself and the shoulder 73ª (Figures 3 and 4).

The bearing structure 76—77 is of any suitable form or construction, preferably of the combined radial and thrust type and hence the companion faces of the races may be frusto-conical as indicated in Figure 2, with suitably shaped rollers 79 therebetween.

In a generally similar manner arms 43 and 44 have secured to their inner ends a bearing housing 81 whose outer cylindrical wall 81ª has fitted into it the outer race 82 of an anti-friction bearing preferably identical to the one above described and hence having also an inner race 83, being of the combined radial and thrust type and hence preferably having contiguous frusto-conical faces between which are the rollers 84.

Race 83 is bored out to be fitted snugly onto the upper stud 72, taking against the shoulder 72ª (Figures 3 and 4) of the stud, while the companion wall 81ᵇ of the bearing housing 81 has a hole to take over the stud 73 but with a suitable amount of clearance therebetween.

The outer end of the stud 72 is threaded to receive a nut 85 by which the bearing assembly may be clamped against the shoulder 72ª.

With such a mounting, the above-mentioned sub-assembly of housing 35 and arm 40 with wheel 11 is dependably mounted for rotation about the coincident axes of the studs 72—73, whence also the wheel 11, having its horizontal axis of rotation substantially displaced (see Figure 1) from the vertical axis of the casing studs 72—73 and about which axis the structure may pivot, is permitted freely to caster or follow where such a castering action is desired.

Where dirigibility is, however, desired, suitable means may be employed to control the swing of this sub-assembly about the above-mentioned vertical axis and, for example, suitable rods or wires (not shown) may be attached to the eyes 57 and 59 (Figure 2) and led off to a suitable manual or other control. Or, as is preferred, I may provide two sheaves 88 and 89, mounted preferably co-axially with the vertical axis of the casing structure 35, as, for example, by fitting them onto the stud 72 and interposing them between the bearing assembly and the nut 85, the latter with the shoulder 72ª thus holding the sheave structure assembled to the casing. If desired, suitable means such as a key 90 (Figure 2) may be employed to insure against relative rotation between the stud 72 and the sheaves 88—89.

To the grooves of the sheaves 88 and 89 are related flexible elements 91 and 92, such as cable, the one, as indicated in Figure 1, extending clockwise about part of the sheave 88 and the other extending counter-clockwise about part of the sheave 89, their respective ends being anchored to the sheaves at suitably displaced points, the cables 91—92 being led off to any suitable operating or control mechanism, not shown, and suitably arranged to haul in on one cable while paying out the other at the same rate, and, of course, reversibly.

In any such case of dirigibility, there is achieved nicety of ease of vertical pivoting, the substantial vertical spacing between the upper and lower bearing structures (see Figure 1) coupled with the preferred form and arrangement of the bearings themselves coacting for these purposes.

The vertical spacing between these bearings, however, and their interrelationship to the other parts insures also dependable action in transmitting, in one direction or the other, such strains and stresses or forces as result from the normal load imposed upon the wheel or as result from impact when the wheel or other landing device carried by the arm 40 contacts the ground. Particularly in making a landing, the forces or stresses set up can greatly vary in direction, magnitude and character. For example, though the horizontal axis of the device such as the wheel 11 carried by the arm 40 may be neatly lined up transversely of the longitudinal axis of the craft, the latter in approaching the land or the like may have its longitudinal axis at an angle to the actual direction of craft flight or movement, and in such case there result also substantial lateral or side thrusts both on the device 11 (Figure 1) and through the arm 41 they are transmitted to the casing structure and to related parts. Here, however, the substantial vertical spacing of the bearing structures (Figure 2) makes it possible better to resist such side thrusts, and thus the tension, compression or bending stresses on such elements as the parts 37—38 and 43—44 are greatly lessened and such parts may be made of lighter construction or materials, while the auxiliary frame members 13—14 materially strengthen the craft frame 10 and its elements and by the above-mentioned multiplicity of points of attachment of the casing structure 35, such stresses are precluded from being concentrated detrimentally and become in effect widely distributed and thus more easily absorbed or resisted.

The construction and mounting of the device 11, illustratively in the form of a wheel is preferably made to take part in these coactions, particularly in itself resisting such out of line or torsional or side thrusts or impacts and in transmitting them, without damage to itself, to the arm 40 and to the housing structure 35 and related parts as above described. Thus, turning to Figure 5, arm 40 terminates preferably in a fork having two arms 40ᵇ and 40ᶜ preferably providing a substantial spacing therebetween and suitably apertured to receive the ends of a shaft 95 threaded at both ends to receive lock nuts 96, thus to provide for ready assembly or disassembly.

I provide a hub means of substantial axial length to be received between the arms 40ᵇ and 40ᶜ, and to provide for ready assembly and detachability of the contacting device itself, such as the wheel 11 which can be in the form of any suitable tire of a material like rubber, either solid or inflated, I preferably make the hub means in two parts 97 and 98 preferably of identical construction. Thus each is recessed at its outer end as at 99 to receive and have fitted therein the outer race 101 of an anti-friction bearing preferably of the combined radial and thrust type and hence illustratively having frusto-conical faces on the outer race 101 and on the inner race 102 with the rollers 103 therebetween.

At the inner ends of these annular end recesses 99, they are stepped or again recessed as at 105, but to a smaller diameter, and before assembling the outer races to their respective recesses 99, a hollow bolt 107 is thrust through the recess 99 of one of the members such as the member 98 to bring its headed end into the recess 105 and to project its shank through the hole 104 and into the hole 104 of the companion member 97, the device such as the wheel 11 having been interposed between the two members 97 and 98, which are suitably shaped or peripherally formed for that purpose somewhat as shown in Figure 5, whence a nut 109, accommodated in the recess 105 of the member 98, is threaded onto the threaded end of the hollow bolt 107, with the aid, for example, of a spanner wrench, thus to clamp the members 97 and 98 together and also to grip the element such as the wheel 11 between the members 97 and 98 and thus held it assembled to the hub structure.

Thence the bearing assemblies may be inserted into the recesses 99 of the members 97 and 98 and the assembly may now be interposed between the fork arms 40ᵇ and 40ᶜ and bolt 95 passed through the holes in the fork arms, through the two inner races 102, and through the hollow bolt 107. The clamping action of the nuts 96 of the bolt 95 may be utilized to clamp against the arms and to fix the races 102 against movement away from the central plane of the assembly or nuts 100 may be used, in which case arms 40ᵇ and 40ᶜ are each clamped between nuts 96 and 100. The hole through the hollow bolt 107 is preferably larger than the diameter of the shaft 95 so as not to interfere with the bearing action of the axially spaced anti-friction bearing structures and also so as to accommodate lubrication, if desired, to be fed in both directions axially to the two bearing structures. Also, if desired, suitable means generally indicated at 109 may be used to cover over the external ends of the bearing structures and protect them against foreign matter and against egress of grease or like lubrication and this means may be of any known or desired construction.

Accordingly, where the wheel is subjected to out-of-line impacts, thrusts or the like, the widely transversely spaced bearing structures directly transmit so much of them as are not absorbed by any cushioning action as may be in the structure 11 itself, to the main arm 40 and thus to the casing structure 35 by which they are distributed and dissipated or taken up as above described. The substantial radial and axial and preferably integral extent of the companion members 97 and 98 give them individually and collectively substantial strength and rigidity and they and their parts give substantial engagement and support to the wheel or tire 11, dependably resisting distortion and dependably transmitting abnormal forces to the axially spaced bearing structures and hence to the arm 40 and remaining parts. Also, disassembly may be quickly achieved, for example, for purposes of replacement or repair of the tire 11.

Moreover, any such side thrusts or impacts are accompanied by or broken down into components which tend to swing the arm 40 in counter-clockwise direction as viewed in Figures 1, 3 and 4, a clean or direct landing plus the normal load of the craft having a similar but direct effect. In any such case, the springs 65 and 66 come into play to absorb and cushion or dissipate materially the energy of such a direct thrust, thus lessening in turn the strains and stresses transmitted by the casing structure 35 to other parts such as the auxiliary frame and also the craft frame.

In this connection and referring first to Figure 3, a preferred arrangement and construction of the springs 65 and 66 is such that normally, as for example, without a load being transmitted by the arm 40, the arm 40 is held in about the position shown in the drawings, in effect floating in normal position under the control of the two springs; in this relationship spring 65 is preferably a stronger or stiffer spring than spring 66 and, illustratively where made of the same kind of wire and wound to the same diameter of helix, spring 65 may be in its normal extended or uncompressed condition while spring 66, preferably made of a wire of smaller diameter, is substantially under maximum compression, and it will thus be noted that spring 65 might be under some compression under these circumstances, thus to hold the parts, including spring 66, in the above-stated positions or condition.

With the normal load of the craft transmitted through the arm 40, spring 65 yields or undergoes compression, being aided in that direction by the tendency of compressed spring 66 to expand, the two springs achieving conditions or lengths appropriate to the particular load and according to the various lever arms that are made effective as a result of the proportioning of the various parts of the arm 40, the lever arms of the abutments 61ᵃ and 62ᵃ being in the illustration substantially equal.

Should the landing device at the free end of the lever 40 receive an impact or be subjected to a suddenly applied load, as sometimes occurs in making a landing, the substantially uncompressed spring 65 undergoes compression and absorbs or dissipates in the process a substantial portion of the energy of the impact, spring 66 having a tendency to aid in that direction and expanding as the arm 40 swings in counter-clockwise direction as viewed in Figures 3 and 4.

As the energy of the impact is thus counteracted or dissipated by the spring 65, which thus has energy stored in it, the tendency of the craft to react and rise somewhat again might receive an aiding impulse of substantial character due to the tendency of the spring 65 at the same moment to expend its stored energy and thus to tend to swing the arm 40 in clockwise direction and thus aid the tendency for upward or rebound movement of the craft, but such tendency or action on the part of the spring 65 is slowed up or counteracted by the now expanded spring 66, which thus resists tendency of the arm 40 to be swung in clockwise direction by the spring 65 and, in absorbing energy expended by the now expanding spring 65, spring 66 insures that the return of the arm 40 to a readjusted position takes place slowly. Thereby tendency quickly to kick the part of the craft supported by the wheel 11, such as the tail, suddenly or quickly in an upward direction, tending to nose the craft over, is dependably guarded against.

The arrangement above described and as shown in Figure 3 may serve dependably where initially the lever arms and strengths of the springs and like factors can be initially suited to the load and impact or strain factors, but according to other features of my invention I make it possible, with a given system of leverages and springs to quickly adapt or suit their actions to any one of a substantial range of load or impact factors, and an illustrative mode of carrying out these features is shown in Figure 4 where again are present the springs 65 and 66 capable of functioning and coacting in the manner above described.

In Figure 4, the springs 65 and 66 are preferably housed in or associated with an expansible and contractible chamber constructed and arranged, under the action of a controlled fluid, to vary or determine the actions of the respective springs. Conveniently and preferably, each of the housings is made up of two telescoping elements and each contains therein, for compactness and also for housing and guidance of the spring, one of the springs.

Thus in the cylindrical chamber 67 is slideably mounted and guided one element 117 of the telescopic housing and in the upper end of the casing structure 35 is supported the downwardly extending companion element 118, the latter being received within the former and suitable packing, indicated at 119, insures tightness against leakage at the junction between the two housing elements as one moves axially relative to the other. The packing structure 119 may be of any suitable construction, illustratively on the order of a stuffing box or gland.

Spring 65 bottoms against the base of the element 117 which externally engages the abutment of lever or rocker arm 61 and its upper end abuts against the internal annular upper end face of the element 118.

The upper external end of element 118 is of reduced diameter as at 118ᵃ to be received within a hole formed in the upper end wall of the casing structure 35, each half section 51 and 52 of which contains, in its upper end wall, half of this round hole, so that the parts 117—65—118 and other parts thereof about to be described may, after having been previously assembled, be laid into position into one half section of the casing, whence the other half is laid thereover and secured together as above earlier described. The upper neck-like portion 118ᵃ is externally threaded to receive a nut 120 which may thereupon be tightened up to securely hold the element 118 in position co-axially with the cylindrical chamber 67.

The portion 118ᵃ is bored out or drilled along its axis and at its upper end is threaded as indicated to receive therein a valve structure 122 generally cylindrical in external shape and threaded at its upper external end for assembly to the portion 118ᵃ, being externally suitably conformed as at 123 in the form of a nut so that it may be tightened up with suitable packing material (not shown) to make a tight joint.

The lower end of the valve structure 122 is of a diameter to be loosely received within the upper end of the spring 65 and is bored out to provide a downwardly facing annular ledge or seat 124 against which rests a valve element 125 which is in the form of a disk centrally apertured and capable of movement downwardly away from the seat 124 against the action of a spring 126 which is housed within the lower end of the valve structure and has its lower end abutting against a suitable plug 127 provided with an aperture 128 preferably of substantial size in comparison to the aperture in the valve element 125.

Along the axis of the valve structure 122, its upper end is drilled and threaded to receive the upper threaded portion of a needle valve structure 130, the lower end of the shank being tapered off or given the shape of a cone to form the needle element 131 of the needle valve structure, for coaction with the aperture in the disk-like valve element 125. The upper end of the threaded shank may be provided with a head 132 knurled or otherwise shaped so that it may be conveniently turned to bring about the desired relationship between the valve elements 125 and 131 and thereby, by determining the extent to which the conical part 131 projects into the aperture in the valve element 125, to set the area of the valve opening when the element 125 is in its normal uppermost position. Lock nuts 131ᵃ lock the setting of elements 131.

The cored out chamber just above the valve element 125 is connected by a pipe 133, suitably fixed, as by threading, into a hole in the wall of the valve structure 122, and it extends through a hole in the wall of the housing element 118, with which it is in sealed connection as by brazing or the like.

The pipe 133 extends transversely of the axis of the telescopic housing 117—118 and through suitable holes in the contiguous walls of the cylindrical chambers 67 and 68 where it is connected to the housing element 118 of the telescopic housing 117—118 and valve structure related to the spring 66 and to the chamber 68, being preferably of identical construction to that above described, thus facilitating manufacture.

Since the parts that are related to the cylindrical chamber 68 are identical to those related to the chamber 67, they need not be described in view of the foregoing and in Figure 4 identical parts of the two are identified by the same reference characters.

These two telescoping housing structures and valve structures may thus be assembled as a sub-unit, made unitary by the pipe connection 133 and as a unit laid into one half-section such as section 52 of the casing structure 35, the walls of the two half-sections containing suitable halves of the holes for receiving the portions 118ᵃ and the pipe connection 133, thus to facilitate laying the companion section 51 over the section 52, thus completing these round holes, whence the sections are secured together and the nuts 120 tightened up.

The lower side portion of valve structure 122 is milled or cut away, leaving side openings 134 that terminate above the threaded part carrying the plug 127 and terminate below the underface of valve member 125, so that downward movement of the latter by a distance greater than the thickness of member 125 makes openings 134 available for flow.

The interiors of the two telescoping housings, connected by the pipe 133, are filled with a suitable liquid such as oil, glycerine or the like, and through the pipe connection 133 transfer of liquid from one spring housing to the other may take place but at respective rates that may be predetermined or set by the respective valve structures.

For example, when the arm 40 is forced in counter-clockwise direction, thus to compress spring 65 and to permit spring 66 to expand, the accompanying upward movement of housing part 117 reduces the volume in the housing 117—118, puts the liquid therein under pressure, and liquid is transferred from the right-hand housing to the housing at the left in Figure 4, the volume of the interior of which increases at the same rate, due to the mechanical connection by way of rock lever 61—62 and the two moveable housing parts 117.

The rate at which transfer of liquid in this direction takes place and hence the rate at which the counter-clockwise movement of the arm 40 may take place is set by adjusting the size of the orifice or valve opening between the valve elements 125 and 131 above the spring 65.

Liquid from the right-hand chamber thus flows through the plug aperture 128, through the valve orifice in valve element 125 and pipe 133, and the resultant pressure, operating against the upper face of valve disk 125 in the left-hand structure, presses the latter downwardly against the spring 126, thus increasing the valve orifice and in effect removing resistance to flow of liquid into the expanding interior of the left-hand structure 117—118, also by way of openings 134 and aperture 128, equilibrium being established at a state of compression of the spring 65 and a state of expansion of the spring 66 according to the circumstances that initiated the counter-clockwise swinging of the arm 40.

Should the arm 40 have been thus swung as a result of a landing operation, the rebound effect may now be determined or set according to the setting of the valve elements in the left-hand housing structure, and the rate of clockwise swing of arm 40 thus suited to the particular circumstances, by having initially adjusted the relationship between the valve elements 125 and 131 above the spring 66. When such reverse action takes place, the left-hand telescopic housing contracts and the right-hand one expands and the transfer of liquid is now in reverse direction and hence from the left toward the right. The pressure of the liquid in the left-hand chamber seats the valve element 125 against its abutment 124, thus restoring the valve orifice to that for which elements 131 and 125 were initially set for the left-hand structure, and now the rate of transfer of liquid from the left-hand telescopic housing to the right-hand one is determined by that orifice or valve opening. In the right-hand housing, the pressure of the liquid against the upper face of valve element 125 presses the latter downwardly against the spring 126, increasing the valve opening to facilitate entry of liquid into the right-hand expanding housing, and also by way of openings 134 and aperture 128.

Thus, though the valve orifices may be set for different rates of ejection for the two hydraulic housings, the setting of either of them for ejection need not be affected by the action of the other on admission, for on admission, the normal or initially set valve opening becomes quickly enlarged under the pressure of the liquid seeking admission, for the downward movement of the valve element 125 relative to the conical valve element 131 can increase the size of the annular valve opening to suit the rate of admission flow, achieving a maximum when the point of the needle element 131 is substantially in the plane of the upper face of the element 125.

Accordingly, the action of each spring may be varied or supplemented by appropriate setting of the relationship of the valve elements 125 and 131 respectively associated with the two springs. For example, maximum valve opening, by setting elements 131, may be such that the two springs function solely like the two springs of Figure 3, while departures from maximum valve opening can be made to determine the respective rates of action of the springs or can be made materially to supplement the action of the springs and thus give the structure a greater load range than if only the springs were present as in Figure 3. Thus a wide variety of operating conditions met with in practice may be reliably met in substantially one and the same unit of construction.

Where retractibility is desired, as earlier above mentioned, the casing structure 35 and the parts rigidly connected thereto (Figures 1 and 2) may be shifted or swung about the axis of the stud shafts 37—38 within the range permitted by the angular spacing between the cut-outs 31 and 32, illustratively about 90° as shown in Figure 1, where the parts are shown in extended position for landing or for handling of the craft when not in the air. In this position, the parts are held and locked by the bottoming of stop element 47 in the cut-out 31 (Figure 1).

Stop element 47 is formed at the upper end of a slidable arm 136 having at its lower end a yoke 137 between the upright or parallel arms of which there is a sleeve or axially elongated collar 138 integrally formed with or having secured to it a lever arm 140 provided at its outer end with a suitable means such as an eye 141 for connection with any suitable operating mechanism such as a rod or link 142 by which the lever arm 140 and hence the sleeve 138 may be positively swung in either clockwise or counter-clockwise direction about its bearing upon stud shaft 37, that being the axis about which the casing structure 35 and related parts may be pivoted or swung as earlier above described. The link 142 may lead to a manual control or to a mechanical relay or the like, of any suitable construction, not shown, and as will be understood.

The yoke 137 has two spaced parallel internal faces 137ª and 137ᵇ spaced apart by the diameter of the sleeve 138 so that the latter, though it swings about its axis, forms a guide for the lower end of the arm 136 in its up and down movement as viewed in Figure 1. At its upper end the arm 136 is also preferably guided and here the lateral walls of the stop element 47, for purposes of such guiding, may engage the side walls of a suitable aperture formed in the underside of the right-hand box structure 45 as seen in Figure 2, the internal face of the detachable plate-like part 45ª forming one side of this guiding aperture and the two-part construction 45—45ª of the box facilitating assembly or disassembly.

The sleeve 138, rotatably supported on the stud shaft 37, is held against sliding axially of the latter by any suitable means such as the bearing block at the right-hand end of the sleeve 138 in Figure 2 and a collar 139 fixed in any suitable manner to the shaft 37 at the left-hand end of the sleeve 138.

Suitable means are provided to urge the arm 136 (Figure 1) toward the axis about which the structure pivots, and for this purpose a spring 145 may be employed. Thus, spring 145 may have its upper end entered in a radial cylindrical recess 37ᶜ formed in shaft 37; its lower portion extends into a hollow tube-like stud 146, shouldered at its lower end as at 146ª, spring 145 thus tending to project or force stud 146 downwardly. Sleeve 138 has an arcuate slot 138ª through which stud 146 passes, its lower end entering a hole 137ᵍ in the lower transverse part 137ʰ of the yoke 137 to the extent permitted by shoulder 146ª. Stud 146 thus holds arm 136 against displacement axially of the sleeve 138, and with spring 145 pressing downwardly as viewed in Figures 1 and 2, the spring pressure is transmitted to the yoke 137 and hence to arm 136.

The sleeve or collar 138 has integrally formed therewith an upstanding cam element 149 shaped substantially as shown in Figure 1 and in line with the longitudinal axis of the arm 136, the yoke has a recess 137ᵈ shaped to accommodate the cam 149 therein and of a depth such that, when the cam 149 is swung into alignment with the arm 136, the arm 136 may move downwardly to an extent to withdraw the stop element 47 from whichever cut-out 31 or 32 it happened to be seated in, the spring 145 insuring such withdrawing movement.

To either side of the bottom of the recess 137ᵈ, the yoke faces are curved as at 137ᵉ and 137ᶠ, forming in effect cam faces for coaction with the cam element 149. From the above-mentioned intermediate or aligned position of the cam 149, rotary movement of the latter in either direction, under the control of lever arm 140, effects rotary movement of the structure about the axis of the stud shafts 37—38 and also ultimate positive locking thereof in ultimate position.

In the positions shown in Figure 1, lever arm 140 is in its maximum clockwise position and cam 149 is underneath the almost horizontal portion of the yoke-cam surface 137ᶠ, with spring 145 compressed and with the stop element 47 thus positively locked in the cut-out 31 in the frame element 13.

To retract the structure, the controls are actuated to move the lever arm 140 in counter-clockwise direction. A first portion of such movement swings arm 140 about shaft 37, as permitted by the slot 138ª, thus sliding cam 149 along the cam surface 137ᶠ, spring 145 bringing stop arm 136 downwardly and stop element 47 being completely withdrawn from the cut-out 31 by the time that cam 149 and recess 137ᵈ are in alignment. The next portion of the movement, being a continued counter-clockwise swinging of lever arm 140, swings arm 136 and through the latter effects pivoting of the entire structure about the axis of shafts 37—38, the engaging left-hand walls of cam 149 and of cam face 137ᵈ or the seating of the cam 149 in the recess 137ᵈ insuring that arm 136 swings with the cam, it being noted that reverse or upward movement of arm 136 is precluded by the under-arcuate face of the frame element 13 once the stop element 47 is withdrawn from the cut-out 31 and a small initial swinging of the structure has taken place. Though stop 47 is so withdrawn, it remains seated in the guiding hole in block 45—45ª and thus carries the entire structure around with it.

Appropriate, even if substantial, force applied to the lever arm 140 may thus insure the continued swinging of the structure in counter-clockwise direction as viewed in Figure 1, the boxes 45—45 (Figure 2) neatly guiding the outer end of the moveable unit, and as soon as the stop element 47 is brought into alignment with the cut-out 32, the cam 149 and cam face 137ᵈ may now partake of relative movement with the result that arm 136 is positively moved in the direction of its length and away from the axis of pivoting, thus to enter the stop or lock element 47 into the cut-out 32, halting pivoting movement of the unit but due to slot 138ª, arm 136 swings further, throughout a third portion of the movement, to complete the swing of cam 149 in counter-clockwise direction to send lock element 47 completely into recess 32 and bring the outermost end of cam 149 underneath the almost horizontal portion of the cam face 137ᵉ, thus positively locking the structure in its new position so long as the control lever arm 140 is held by any suitable means such as its manual or other actuated mechanism, against retrograde movement. In this position of the parts the arm 40 with the landing devices carried by it is in retracted position. The cables 91—92 or the cables connected to the eyes 57—59, for dirigibility, flex appropriately as the above movement in retracting direction takes place, again becoming taut when reverse movement and hence extension are completed.

Extension takes place, as will now be clear, by a reverse sequence of steps. Thus from its extreme left-hand position, for extension of the device, lever arm 140 is now positively moved in clockwise direction, the first portion of that movement being, due to slot 138ª, relative to shaft 37 and riding the cam 149 out from in under the lower portion of the cam surface 137ᵉ and into alignment with the recess 137ᵈ, whence the stop member 47 is withdrawn from the cut-out 32 under the action of spring 145, and thereafter, with the right-hand face of cam 149 bearing against the right-hand face of recess 137ᵈ, the entire pivotal unit pivots with arm 136 about the axis of stud shafts 37—38 in clockwise direction and when stop element 37 comes into alignment with an catches in cut-out 31, pivoting of the unit halts, but arm 140 continues to swing and cam 149 cams the yoke and arm 136 upwardly as viewed in Figure 1 to project stop 47 completely into the cut-out 31, bringing the cam 149 underneath the almost horizontal portion of the cam face 137ᶠ and thereby also locking member 47 against movement out of the cut-out 31.

If desired, suitable stop elements may be provided on the auxiliary frame in order definitely to fix the limits of swing of the pivotal unit, and in Figure 1 I have shown two such stop elements in the form of blocks 152—153 screwed or otherwise secured to a side face of the frame element 13 to be engaged by the box 45 in which the stop arm 136 is guided; they are positioned at such respective points that the stop element 47 is positively lined up with either of the cut-outs 31 or 32 according to the direction of pivoting and which of the two steps 152—153 is made effective.

Also, it might be noted that the coaction between the spring 145, cam 149, and the two angularities formed at the upper ends of the guide faces 137ª and 137ᵇ of the yoke 137 may also be such as in effect to lock the lever 140 in either of its extremes of swinging movement. Thus, at the extreme clockwise position shown in Figure 1, the cam 149 is to the right of its pivoting axis and extends into the angularity at the upper end of face 137ᵇ in which it is substantially held by the downward pressure of the now compressed spring 146. A similar action in the angularity at the upper end of the face 137ª locks the lever in its other extreme position. And, by making these angularities more acute or somewhat less than 90°, a more positive locking action at each extreme may be achieved.

Where retractibility is not desired, the sub-unit may be easily and quickly mounted in position for caster-wheel action or for dirigibility, as illustratively indicated in Figures 6 and 7 where, for purposes of illustration, it is assumed that the craft frame 155 terminates at its tail end in two frame elements 156—157 forming a V with an upright frame element 158 at the apex. In such case, the lower bearing housing 75 (see also Figure 2) has secured to it two arms 159 and 160 terminating in suitable split sleeve clamping elements 161 and 162 respectively by which, or any other suitable means, the bracket arms 159—160 may be secured to the frame elements 156—157 respectively, while the upper bearing housing 81 (see also Figure 2) may have secured to it suitable arms such as an arm 163 extending rearwardly to the upright post 158 to which it may be secured in any suitable way as by the split clamping sleeve structure 164, and two laterally and downwardly extending bracket arms 166 and 167 secured respectively to the frame elements 156 and 157, as by split clamping sleeve elements 168 and 170.

Thus it will be seen that the construction has wide range of adaptability and if in the illustrative arrangement of Figures 6–7 dirigibility is desired, the sheaves 88—89 may be utilized or the eyelet elements 56—58, as was described above in connection with Figures 1 and 2.

Thus it will be seen that there has been provided in this invention a construction in which the various objects above set forth together with many thoroughly practical advantages are successfully achieved. It will be seen that the construction is compact, is in its various parts simple to manufacture, its various sub-assemblies are easily and quickly effected, and one sub-unit may easily and quickly be assembled to or with another, and that wide range of adaptability is achievable. Moreover, it will be seen that the construction is well adapted to withstand the peculiar and varying strains and stresses and is also capable of handling or being accommodated to a substantial range of different load or impact conditions met with in practice.

Also, it will be seen that the construction lends itself readily to nicely balanced action or control. For example, though, in the foregoing description, the lock member 47 and its related control and operating mechanism has been described as related to the element 13, the stop element 47 and its control and operating mechanism may be easily duplicated and related to cut-outs 31—32 in the curved element 14, with the operating lever and cam sleeve 138 pivoting about the stud shaft 38, all as shown in Figure 2. In such case, the two lever arms 140 are operated in synchronism by any suitable means (not shown) or, for example, the two links 142 that lead to the two lever arms may be mechanically fixed in any suitable way (not shown) to move in unison.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In construction of the character described, in combination, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coaction with said lever arm means, said two casing parts having means coacting with the pivotal support of said arm for pivotally supporting it and having companion extension means forming, when said casing parts are secured together, an axis about which said casing may pivot, bearing means coacting with said companion axis-forming means for pivotally supporting said casing, means for supporting said bearing means to swing about an axis extending at an angle thereto, and means for controlling the direction and extent of swinging thereof.

2. In construction of the character described, in combination, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coaction with said lever arm means, said two casing parts having means coacting with the pivotal support of said arm for pivotally supporting it and having companion extension means forming, when said casing parts are secured together, an axis about which said casing may pivot, spaced bearing means for pivotally supporting said casing and coacting with said axis-forming means, means pivotally supporting one of said spaced bearing means, and means comprising an arcuate guiding element coacting with the other of said spaced bearing means during pivoting of said casing structure about the pivotal support of said one of said spaced bearing means.

3. A construction as claimed in claim 2 provided with locking means, said locking means comprising spaced locking recesses in said arcuate guiding means and a lock member having means mounting it for movement along a radius with the axis of said one spaced bearing means at substantially its center, and a lever arm for swinging said casing about the axis of said one spaced bearing means and for controlling the position of said lock member.

4. A construction as claimed in claim 2 provided with locking means, said locking means comprising spaced locking recesses in said arcuate guiding means and a lock member having means mounting it for movement along a radius with the axis of said one spaced bearing means at substantially its center, means adapted upon movement to swing said casing about said pivoting axis of said one of said spaced bearing means and having a lost motion connection therewith, and means responsive to the action of said lost motion connection for controlling said lock member.

5. In construction of the character described, in combination, a frame, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coacting with said lever arm means, said two casing parts having means coacting with the pivot of said arm for pivotally supporting it and means for holding said casing parts assembled, and means connected with said secured-together casing parts for pivotally supporting them and said arm from said frame as a unit to swing about a horizontal axis for thereby retracting or extending said device, said last-mentioned means including means providing a vertical axis of pivoting for said secured-together parts whereby said parts and arm and device may move also about said vertical axis.

6. In construction of the character described, in combination, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coacting with said lever arm means, said two casing parts having means coacting with the pivot of said arm for pivotally supporting it, means forming a variable chamber encased by said casing parts and receivable therebetween upon assembly and having means responsive to pivoting movement of said arm to vary the volume thereof, and means forming a fluid connection to said variable chamber and including means for controlling fluid flow to and from said variable chamber to thereby vary the rate of change of volume of said variable chamber.

7. In construction of the character described, in combination, an arm for supporting a landing device at one end and having at the other end a pivotal support with lever arm means extending therefrom, two companion casing parts said other end extending into and between said two companion casing parts, spring means, said casing parts having therein companion chamber-forming walls for housing, when assembled together, said spring means for coaction with said lever arm means, said two casing parts having means coacting with the pivot of said arm for pivotally supporting it, means forming a variable chamber encased by said casing parts and receivable therebetween upon assembly and having means responsive to pivoting movement of said arm to vary the volume thereof, said variable chamber containing a fluid, and means including controllable valve means in connection with said chamber for controlling the rate of ejection or admission of fluid as the volume of said chamber is varied by said arm.

8. In construction of the character described, in combination, a support having means moveably supporting a member carrying a landing device whereby said landing device may move toward and then away from said support, a differentially-acting hydraulic means acting upon said member to oppose movement of said member toward said support and capable of yielding at a certain rate under adequate load or impact, and means changing the differential between said two hydraulic means for controlling the rate at which said member thereafter moves away from said support upon lessening or removal of the load.

9. A retractible and extendible landing gear comprising a main support having means for supporting a landing device, means providing a pivotal support for said main support to swing about a substantially horizontal axis for thereby retracting or extending said device, means for locking said main support at either of two positions to swing about said axis corresponding substantially to retraction or extension of said device, and reversible mechanism for effecting swinging of said main support and for controlling said locking means, said mechanism operating in a cycle of steps of which the first effects unlocking of said locking means, the second effects swinging of said support about its axis, and the third effects locking of said locking means.

10. A retractible and extendible landing gear comprising a main support having means for supporting a landing device, means providing a pivotal support for said main support to swing about a substantially horizontal axis for thereby retracting or extending said device, locking means comprising a lock member having means mounting it for swinging movement with said support and companion locking means having means mounting it fixedly in position to coact with said locking member in either of the extremes of pivoting movement of said support, a lever having means mounting it to pivot about said axis and having means forming a lost-motion connection with said support, and means responsive to the lost motion in said connection for actuating said locking member.

11. A retractible and extendible landing gear comprising a main support having means for supporting a landing device, means providing a pivotal support for said main support to swing about a substantially horizontal axis for thereby retracting or extending said device, locking means comprising a lock member having means mounting it for swinging movement with said support and companion locking means having means mounting it fixedly in position to coact with said locking member in either of the extremes of pivoting movement of said support, a lever having means pivotally mounting it, and coacting cam means associated respectively with said lever and with said locking member and constructed to control movement of said locking member in un-locking direction in response to a first stage of movement of said lever, then to swing said support about its pivot in response to a succeeding stage of movement of the lever, and in a final stage of movement of the lever to control movement of said locking member in locking direction.

12. In construction of the character described, in combination, a support having means moveably supporting a member carrying a landing device whereby said landing device may move toward and then away from said support, two means forming chambers capable of having their volume varied and having means mechanically connecting and relating them to said member so that the volume of one increases as the volume of the other decreases in response to transmission thereto by said connecting means of movement of said member relative to said support, means forming a connection between said two chambers for interchange of fluid therebetween, and combined discharge and admission valve means for each chamber for controlling the rate of fluid interchange, and means for rendering one of said valve means ineffective for controlling said rate of interchange responsive to fluid interchange in one direction and means rendering the other of said valve means ineffective for controlling said rate of interchange responsive to fluid interchange in the opposite direction.

13. In construction of the character described, in combination, a support having means moveably supporting a member carrying a landing device whereby said landing device may move toward and then away from said support, two means forming chambers capable of having their volume varied and having means mechanically connecting and relating them to said member so that the volume of one increases as the volume of the other decreases in response to transmission thereto by said connecting means of movement of said member relative to said support, means forming a connection between said two chambers for reversible flow of fluid between said two chambers and including controllable discharge valve means, one for each chamber, and admission valve means, one for each chamber, the admission valve means of one chamber having a flow factor at least as great as the flow factor of the discharge valve means of the other chamber.

14. In construction of the character described, in combination, a support having means moveably supporting a member carrying a landing device whereby the latter may move toward or away from said support, two spring means having means relating them to said member so that one yieldingly opposes movement of said member toward said support and the other yieldingly opposes movement of said member away from said support, means enclosing said two spring means and forming a chamber for each that is expandible or contractible and hence of variable volume, means forming a fluid connection between said two chambers, and means for controlling the rate of interchange of fluid therebetween.

15. In construction of the character described, in combination, a support having means moveably supporting a member carrying a landing device whereby the latter may move toward or away from said support, two spring means having means relating them to said member so that one yieldingly opposes movement of said member toward said support and the other yieldingly opposes movement of said member away from said support, two hydraulic piston and cylinder means having a fluid connection therebetween and means mechanically relating each of them to said member so that the volume of one increases and the volume of the other decreases in response to transmission thereto by said mechanically-relating means of movement of said member relative to said support, and valve means capable of fixing different rates of flow for the two directions of interchange of fluid between said two piston and cylinder means.

16. In construction of the character described, in combination, a support having means movably supporting a member carrying a landing device whereby said landing device may move toward and then away from said support, two means forming chambers capable of having their volume varied and having means mechanically connecting and relating them to said member so that the volume of one increases as the volume of the other decreases in response to transmission thereto by said connecting means of movement of said member relative to said support, means forming a connection between said two chambers for reversible flow of fluid between said two chambers and including a combined discharge and admission valve means, one for each chamber and each comprising an orifice member, means for varying at will the effective size of each orifice for discharge flow, and yielding means responsive to pressure of fluid flowing in admission direction for decreasing the restriction of the rate of intake of fluid according to the pressure thereof.

17. In construction of the character described, in combination, a support having means movably supporting a member carrying a landing device whereby said landing device may move toward and then away from said support, two means forming chambers capable of having their volume varied and having means mechanically connecting and relating them to said member so that the volume of one increases as the volume of the other decreases in response to transmission thereto by said connecting means of movement of said member relative to said support, means forming a connection between said two chambers for reversible flow of fluid between said two chambers and including a combined discharge and admission valve means, one for each chamber and each comprising an orifice member, valve means for varying at will the effective size of each orifice for discharge flow, means mounting said orifice member for movement away from said valve means in response to pressure of fluid flowing in admission direction to decrease the restriction of the rate of intake of fluid, and port means coacting with such aforesaid movement of the orifice member for admission of fluid into the chamber.

18. In construction of the character described, in combination, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coaction with said lever arm means, said two casing parts having means coacting with the pivot of said arm for pivotally supporting it and moveable (pistonlike) piston and cylinder means receivable within and encased by said two casing parts when assembled for coaction with said spring means upon said lever arm means of said arm, a fluid within said cylinder means and fluid valve means communicating with said cylinder means for controlling fluid flow into and out of said cylinder means.

19. In construction of the character described, in combination, an arm for supporting a landing device at one end and having at the other end a pivotal support with lever arm means extending therefrom, two companion casing parts, said other end extending into and between said two companion casing parts, spring means, said casing parts having therein companion chamber-forming walls for housing, when assembled together, said spring means for coaction with said lever arm means, said two casing parts having means coacting with the pivot of said arm for pivotally supporting it and piston and cylinder means responsive to fluid under pressure and encased by said casing and receivable between the two parts thereof upon assembly and constructed for coacting with said lever arm means to modify the action of said spring means upon said lever arm means, means securing said companion casing parts together, and a fluid for coacting with said fluid-responsive means.

20. In an aircraft landing gear, in combination, a support, a casing thereon having therein two spring means, a member for supporting a landing device and having a part extending into said casing, with means movably supporting it relatively to said casing whereby said landing device may move toward and away from said support, one of said springs being normally under stress and acting upon said part in a direction aiding movement of said landing device toward said support and the other of said springs acting upon said part in the direction opposing movement of said landing device toward said support and being of a stiffness greater than said first spring to thereby resist the stress imposed thereon by said normally-stressed spring.

ALDO M. FRANCHI.

REFERENCES CITED

The following references are of record in the file of this patent:

UNITED STATES PATENTS

| Number | Name | Date |
| --- | --- | --- |
| 963,650 | Raymond | July 5, 1910 |
| 1,111,924 | Smith | Sept. 29, 1914 |
| 1,752,183 | Kell | Mar. 25, 1930 |
| 1,847,491 | Messier | Mar. 1, 1932 |
| 1,928,816 | Grayson | Oct. 3, 1933 |
| 2,011,460 | Snyder | Aug. 13, 1935 |
| 2,021,306 | Hathorn | Nov. 19, 1935 |
| 2,077,934 | Johnson | Apr. 20, 1937 |
| 2,206,800 | Armstrong | July 2, 1940 |
| 2,240,892 | Meyer | May 6, 1941 |

FOREIGN PATENTS

| Number | Country | Date |
| --- | --- | --- |
| 359,466 | Great Britain | Apr. 15, 1930 |
| 520,944 | Great Britain | May 8, 1940 |
| 819,026 | France | June 28, 1937 |